(12) United States Patent
Oshima et al.

(10) Patent No.: US 12,062,754 B2
(45) Date of Patent: Aug. 13, 2024

(54) BATTERY

(71) Applicant: Panasonic Intellectual Property Management Co., Ltd., Osaka (JP)

(72) Inventors: Tatsuya Oshima, Osaka (JP); Izuru Sasaki, Aichi (JP); Hiroki Kamitake, Osaka (JP); Akira Kawase, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 670 days.

(21) Appl. No.: 17/214,943

(22) Filed: Mar. 29, 2021

(65) Prior Publication Data

US 2021/0218054 A1 Jul. 15, 2021

Related U.S. Application Data

(63) Continuation of application No. PCT/JP2019/047356, filed on Dec. 4, 2019.

(30) Foreign Application Priority Data

Dec. 27, 2018 (JP) .................... 2018-244146

(51) Int. Cl.
*H01M 10/0562* (2010.01)
*H01M 10/0525* (2010.01)

(52) U.S. Cl.
CPC .... *H01M 10/0562* (2013.01); *H01M 10/0525* (2013.01); *H01M 2300/008* (2013.01);
(Continued)

(58) Field of Classification Search
CPC ....... H01M 10/0562; H01M 2300/008; H01M 2300/0088
(Continued)

(56) References Cited

U.S. PATENT DOCUMENTS

| 9,093,707 B2* | 7/2015 | Lee .................. H01M 6/40 |
| 2012/0028129 A1 | 2/2012 | Furuya |
| 2012/0110835 A1 | 5/2012 | Hudson et al. |
| 2014/0030607 A1 | 1/2014 | Noguchi |

(Continued)

FOREIGN PATENT DOCUMENTS

| CN | 103579664 A | 2/2014 |
| JP | 8-222235 | 8/1996 |

(Continued)

OTHER PUBLICATIONS

Asano et al., Solid Halide Electrolytes with High Lithium-Ion Conductivity for Application in 4 V Class Bulk-Type All-Solid-State Batteries, Sep. 14, 2018, Advanced Materials, vol. 30, Abstract and p. 1 (Year: 2018).*

(Continued)

*Primary Examiner* — Pamela H Weiss
*Assistant Examiner* — John S Medley
(74) *Attorney, Agent, or Firm* — Rimon P.C.

(57) ABSTRACT

A battery includes a positive electrode, a negative electrode, and an electrolyte layer disposed between the positive electrode and the negative electrode. The electrolyte layer includes a first layer, a second layer, and a mixture layer disposed between the first layer and the second layer. The first layer includes a first solid electrolyte material. The second layer includes a second solid electrolyte material, the second solid electrolyte material being different from the first solid electrolyte material. The mixture layer includes the first solid electrolyte material and the second solid electrolyte material.

8 Claims, 1 Drawing Sheet

(52) U.S. Cl.
CPC ............... *H01M 2300/0091* (2013.01); *H01M 2300/0094* (2013.01)

(58) Field of Classification Search
USPC ........................................................ 429/323
See application file for complete search history.

(56) References Cited

U.S. PATENT DOCUMENTS

| | | | |
|---|---|---|---|
| 2018/0316056 A1 | 11/2018 | Katoh et al. | |
| 2019/0088995 A1 | 3/2019 | Asano et al. | |

FOREIGN PATENT DOCUMENTS

| | | |
|---|---|---|
| JP | 2010-251113 | 11/2010 |
| JP | 2011-081915 | 4/2011 |
| JP | 2014-216131 | 11/2014 |
| WO | 2014/162532 A1 | 10/2014 |
| WO | 2015/151144 A1 | 10/2015 |
| WO | 2018/025582 | 2/2018 |

OTHER PUBLICATIONS

Deng, Z., First Principles Modeling of Lithium Solid Electrolytes, 2018, UC San Diego, pp. 44 and 46 (Year: 2018).*
International Search Report of PCT application No. PCT/JP2019/047356 dated Mar. 3, 2020.
The Extended European Search Report dated Jan. 21, 2022 for the related European Patent Application No. 19904188.0.
The Indian Office Action dated Jan. 17, 2023 for the related Indian Patent Application No. 202147015624.

* cited by examiner

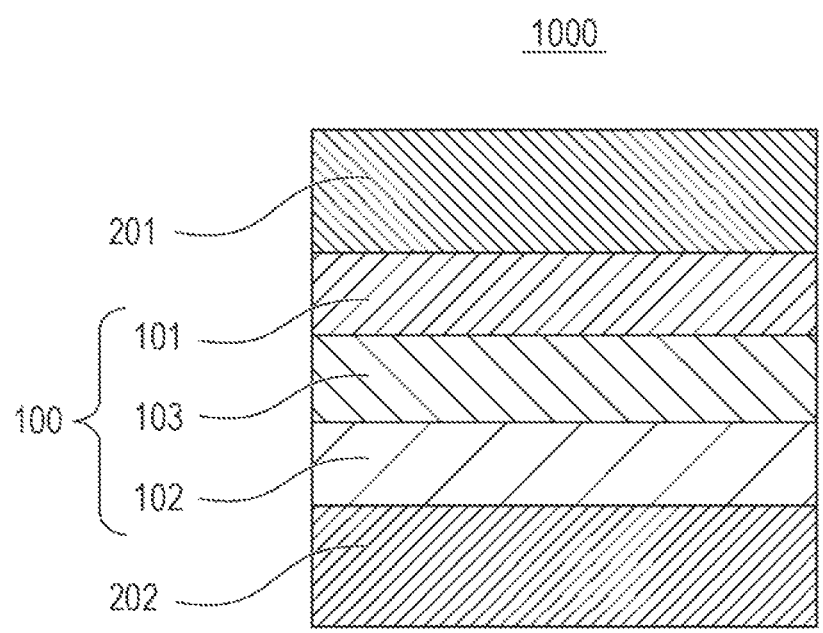

BATTERY

BACKGROUND

1. Technical Field

The present disclosure relates to batteries.

2. Description of the Related Art

Japanese Unexamined Patent Application Publication No. 2014-216131 discloses a battery including a positive electrode layer, a crystal electrolyte layer, a glass electrolyte layer, a crystal electrolyte layer, and a negative electrode layer, which are stacked in the order stated.

SUMMARY

In one general aspect, the techniques disclosed here feature a battery including a positive electrode, a negative electrode, and an electrolyte layer disposed between the positive electrode and the negative electrode. The electrolyte layer includes a first layer, a second layer, and a mixture layer disposed between the first layer and the second layer. The first layer includes a first solid electrolyte material, the second layer includes a second solid electrolyte material, the second solid electrolyte material being different from the first solid electrolyte material, and the mixture layer includes the first solid electrolyte material and the second solid electrolyte material.

Additional benefits and advantages of the disclosed embodiments will become apparent from the specification and drawing. The benefits and/or advantages may be individually obtained by the various embodiments and features of the specification and drawing, which need not all be provided in order to obtain one or more of such benefits and/or advantages.

BRIEF DESCRIPTION OF THE DRAWINGS

FIGURE is a cross-sectional view illustrating a general configuration of a battery according to a first embodiment.

DETAILED DESCRIPTION

The present disclosure includes batteries itemized as follows.

Item 1

According to Item 1 of the present disclosure, a battery includes a positive electrode, a negative electrode, and an electrolyte layer disposed between the positive electrode and the negative electrode. The electrolyte layer includes a first layer, a second layer, and a mixture layer disposed between the first layer and the second layer. The first layer includes a first solid electrolyte material, the second layer includes a second solid electrolyte material, the second solid electrolyte material being different from the first solid electrolyte material, and the mixture layer includes the first solid electrolyte material and the second solid electrolyte material.

Item 2

In the battery according to Item 1, one of the first solid electrolyte material and the second solid electrolyte material may have a Young's modulus lower than a Young's modulus of another of the first solid electrolyte material and the second solid electrolyte material, and the one of the first solid electrolyte material and the second solid electrolyte material may constitute a volume fraction of greater than 50% in the mixture layer.

Item 3

In the battery according to Item 1 or 2, the first layer may be disposed between the positive electrode and the mixture layer, the second layer may be disposed between the negative electrode and the mixture layer, and a reduction potential of the second solid electrolyte material may be less noble than a reduction potential of the first solid electrolyte material.

Item 4

In the battery according to any one of Items 1 to 3, the first solid electrolyte material may contain Li, M1, and X1, where M1 is at least one selected from the group consisting of metalloid elements and metal elements other than Li, and X1 is at least one selected from the group consisting of F, Cl, Br, and I.

Item 5

In the battery according to Item 4, the first solid electrolyte material may be represented by a composition formula of $Li_{\alpha 1} M1_{\beta 1} X1_{\gamma 1}$, where $\alpha 1$, $\beta 1$, and $\gamma 1$ are each a value greater than zero.

Item 6

In the battery according to Item 4 or 5, M1 may include yttrium.

Item 7

In the battery according to any one of Items 1 to 6, the second solid electrolyte material may be a sulfide solid electrolyte.

Item 8

In the battery according to any one of Items 1 to 6, the second solid electrolyte material may contain Li, M2, and X2, where M2 is at least one selected from the group consisting of metalloid elements and metal elements other than Li, and X2 is at least one selected from the group consisting of F, Cl, Br, and I.

Item 9

In the battery according to Item 8, the second solid electrolyte material may be represented by a composition formula of $Li_{\alpha 2} M2_{\beta 2} X2_{\gamma 2}$, where $\alpha 2$, $\beta 2$, and $\gamma 2$ are each a value greater than zero.

Item 10

In the battery according to Item 8 or 9, M2 may include yttrium.

An embodiment of the present disclosure will now be described with reference to the drawing.

First Embodiment

FIGURE is a cross-sectional view illustrating a general configuration of a battery 1000, according to a first embodiment.

The battery 1000 includes a positive electrode 201, a negative electrode 202, and an electrolyte layer 100, which is disposed between the positive electrode 201 and the negative electrode 202. The electrolyte layer 100 includes a first layer 101, a second layer 102, and a mixture layer 103, which is disposed between the first layer 101 and the second layer 102. With this configuration, the output of the battery 1000 is improved.

The first layer 101 includes a first solid electrolyte material, and the second layer 102 includes a second solid electrolyte material, which is different from the first solid electrolyte material. It should be noted that it is sufficient that the first layer include the first solid electrolyte material as a major component, and the second layer include the second solid electrolyte material, which is different from the first solid electrolyte material, as a major component. A mass percentage of the first solid electrolyte material, which is the major component, in the entirety of the first layer 101 may be, for example, greater than or equal to 50 mass %, or, greater than or equal to 70 mass %. A mass percentage of the second solid electrolyte material, which is the major component, in the entirety of the second layer 102 may be, for example, greater than or equal to 50 mass %, or, greater than or equal to 70 mass %

It is sufficient that the first solid electrolyte material included in the first layer 101 be at least one selected from a first group consisting of a plurality of solid electrolyte materials. The first layer 101 may be a single-layer structure or a multi-layer structure. For example, the first layer 101 may be formed of a plurality of layers, and the layers may have different respective compositions.

It is sufficient that the second solid electrolyte material included in the second layer 102 be at least one selected from a second group consisting of a plurality of solid electrolyte materials. The second layer 102 may be a single-layer structure or a multi-layer structure. For example, the second layer 102 may be formed of a plurality of layers, and the layers may have different respective compositions.

The second solid electrolyte material is a material different from the first solid electrolyte material. In this instance, the first solid electrolyte materials belonging to the first group are not the same as the second solid electrolyte materials belonging to the second group. However, the first layer 101 may partially include a solid electrolyte material that is the same as one in the second layer 102. A solid electrolyte material that is included in the first layer 101 and also included in the second layer 102 may be present in an amount of, for example, less than or equal to 50%, less than or equal to 30%, or less than or equal to 10%, relative to an amount of the first layer 101, in terms of a volume fraction. Likewise, the second layer 102 may partially include a solid electrolyte material that is the same as one in the first layer 101. A solid electrolyte material that is included in the second layer 102 and also included in the first layer 101 may be present in an amount of, for example, less than or equal to 50%, less than or equal to 30%, or less than or equal to 10%, relative to an amount of the second layer 102, in terms of a volume fraction.

The mixture layer 103 includes the first solid electrolyte material and the second solid electrolyte material. That is, the mixture layer includes at least two solid electrolyte materials. The mixture layer 103 may be a single-layer structure or a multi-layer structure. For example, the mixture layer 103 may be formed of a plurality of layers, and the layers may have different respective compositions.

Note that it is sufficient that, for example, 30% or more of the solid electrolyte materials that form the mixture layer be the same as the first solid electrolyte material, and, for example, another 30% or more of the solid electrolyte materials be the same as the second solid electrolyte material, in terms of a volume fraction. In some cases, in instances in which a solid electrolyte material X, which is present in the highest content in the first layer 101, constitutes a volume fraction of x % in the first layer, and a solid electrolyte material Y, which is present in the highest content in the second layer 102, constitutes a volume fraction of y % in the second layer, the solid electrolyte material X may be present in the mixture layer in an amount greater than or equal to 0.3×x %, and the solid electrolyte material Y may be present in the mixture layer in an amount greater than or equal to 0.3×y %, in terms of a volume fraction.

Japanese Unexamined Patent Application Publication No. 2014-216131 discloses a battery including a positive electrode layer, a crystal electrolyte layer, a glass electrolyte layer, a crystal electrolyte layer, and a negative electrode layer, which are stacked in the order stated. According to Japanese Unexamined Patent Application Publication No. 2014-216131, the glass electrolyte layer becomes crushed during press forming, and as a result, the battery has improved interlayer adhesion.

However, from an investigation conducted by the present inventors, the following findings were made. In instances in which a layered body of different solid electrolyte layers is formed by stacking and compressing different solid electrolyte materials having different compression properties, residual stress between the different solid electrolyte layers can result in delamination. In this case, a problem arises in that the output characteristics of the battery deteriorate. The problem can be solved by disposing, between different solid electrolyte layers, a mixture layer in which different solid electrolyte materials are mixed with one another. That is, providing the mixture layer improves adhesion between different solid electrolyte layers, thereby inhibiting delamination. As a result, the output characteristics of the battery are improved.

In the mixture layer 103, one of the first solid electrolyte material and the second solid electrolyte material may have a Young's modulus lower than that of the other and may constitute a volume fraction of greater than 50% in the mixture layer. In this case, in instances in which the first solid electrolyte material and/or the second solid electrolyte material includes two or more solid electrolyte material components, one of the solid electrolyte material components that has the lowest Young's modulus may constitute a volume fraction of greater than 50% in the mixture layer. With this configuration, the output characteristics of the battery are improved. This is because when a solid electrolyte material having a low Young's modulus, in other words, a pliable solid electrolyte material, constitutes more than half of the volume of the mixture layer 103, the bond between the first layer 101 and the second layer 102 is improved.

In the mixture layer 103, one of the first solid electrolyte material and the second solid electrolyte material, the one being a solid electrolyte material having a lower Young's modulus (or a solid electrolyte material component having the lowest Young's modulus), may constitute a volume fraction of 60% or more, or, 70% or more. With this configuration, the output characteristics of the battery are improved.

The Young's moduli of the solid electrolyte materials may be measured by using, for example, a nanoindentation method. Specifically, the indenting element of a nanoindenter is pressed into the solid electrolyte material, a load is applied to the solid electrolyte material, and an amount of the resulting displacement of the indenting element is measured. In this manner, the Young's modulus of a microscopic region can be determined.

The volume fractions of the first solid electrolyte material and the second solid electrolyte material in the mixture layer 103 may be calculated as follows, for example. A cross section of the mixture layer 103 is processed by using a cross section polisher (CP). Next, elemental mapping is conducted by energy dispersive X-ray spectroscopy (SEM-EDX), and, from the ratio between the areas occupied by the respective materials, the volume ratio can be determined.

In instances in which the first layer 101 is disposed between the positive electrode 201 and the mixture layer 103, and the second layer 102 is disposed between the negative electrode 202 and the mixture layer 103, a reduction potential of the second solid electrolyte material may be less noble than a reduction potential of the first solid electrolyte material. With this configuration, the output characteristics of the battery are improved. Furthermore, a reductive decomposition of the first solid electrolyte material that may occur when the first solid electrolyte material comes into contact with the negative electrode active material is inhibited.

Solid Electrolyte Material

In the present disclosure, the "metalloid elements", as referred to below, are B, Si, Ge, As, Sb, and Te. Furthermore, the "metal elements" are all the elements (excluding hydrogen) from Group 1 to Group 12 of the periodic table and all the elements (excluding B, Si, Ge, As, Sb, Te, C, N, P, O, S and Se) from Group 13 to Group 16 of the periodic table. That is, the "metalloid elements" and the "metal elements" are elements that can become a cation in instances in which the element forms an inorganic compound with a halogen element.

The first solid electrolyte material may be a material that contains Li, M1, and X1. The element M1 is at least one selected from the group consisting of metalloid elements and metal elements other than Li. Furthermore, the element X1 is at least one selected from the group consisting of F, Cl, Br, and I. With any of these configurations, ionic conductivity of the first solid electrolyte material is further improved. As a result, the output characteristics of the battery are further improved. Furthermore, thermal stability of the battery is improved. Furthermore, in instances in which the first solid electrolyte material does not contain sulfur, generation of hydrogen sulfide gas can be inhibited.

For example, the first solid electrolyte material may be a material represented by composition formula (1): $Li_{\alpha 1}M1_{\beta 1}X1_{\gamma 1}$, where $\alpha 1$, $\beta 1$, and $\gamma 1$ are each a value greater than zero. $\gamma 1$ may be, for example, 4, 6, or the like. With any of these configurations, the ionic conductivity of the first solid electrolyte material is improved. As a result, the output characteristics of the battery are improved.

On the other hand, the second solid electrolyte material may be a sulfide solid electrolyte material. In the present disclosure, the "sulfide solid electrolyte" is a solid electrolyte containing sulfur. Examples of the sulfide solid electrolyte include $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$. Furthermore, to any of these, LiX, $Li_2O$, $MO_q$, $Li_pMO_q$, and/or the like may be added. The element X is at least one selected from the group consisting of F, Cl, Br, and I. Furthermore, the element M is at least one selected from the group consisting of P, Si, Ge, B, Al, Ga, In, Fe, and Zn. Furthermore, p and q are each a natural number. With any of these configurations, the output characteristics of the battery are further improved.

The second solid electrolyte material may be a material that contains Li, M2, and X2. The element M2 is at least one selected from the group consisting of metalloid elements and metal elements other than Li. Furthermore, the element X2 is at least one selected from the group consisting of F, Cl, Br, and I. With any of these configurations, ionic conductivity of the second solid electrolyte material is further improved. As a result, the output characteristics of the battery are further improved. Furthermore, the thermal stability of the battery is improved. Furthermore, in instances in which the second solid electrolyte material does not contain sulfur, generation of hydrogen sulfide gas can be inhibited.

For example, the second solid electrolyte material may be a material represented by composition formula (2): $Li_{\alpha 2}M2_{\beta 2}X2_{\gamma 2}$, where $\alpha 2$, $\beta 2$, and $\gamma 2$ are each a value greater than zero. $\gamma 2$ may be, for example, 4, 6, or the like. With any of these configurations, the ionic conductivity of the second solid electrolyte material is improved. As a result, the output characteristics of the battery are improved.

In composition formula (1), the element M1 may include Y (=yttrium). Furthermore, in composition formula (2), the element M2 may include Y (=yttrium). That is, the first solid electrolyte material and/or the second solid electrolyte material may contain Y as a metal element.

A Y-containing first solid electrolyte material and a Y-containing second solid electrolyte material may be each independently a compound represented by, for example, a composition formula of $Li_aMe_bY_cX_6$, where $a+mb+3c=6$, and $c>0$ are satisfied. The element Me is at least one selected from the group consisting of metalloid elements and metal elements other than Li or Y. m represents the valence of the element Me. The element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, and Nb.

The first solid electrolyte material and the second solid electrolyte material may be each independently any of the following materials, for example. With any of the configurations described below, the ionic conductivity of the first solid electrolyte material and/or the second solid electrolyte material is further improved. As a result, the output characteristics of the battery are further improved.

The first solid electrolyte material and/or the second solid electrolyte material may be a material represented by composition formula (A1):

$$Li_{6-3d}Y_dX_6$$

where the element X is at least one selected from the group consisting of Cl, Br, and I, and further, $0<d<2$ is satisfied.

The first solid electrolyte material and/or the second solid electrolyte material may be a material represented by composition formula (A2):

$$Li_3YX_6$$

where the element X is at least one selected from the group consisting of Cl, Br, and I.

The first solid electrolyte material and/or the second solid electrolyte material may be a material represented by composition formula (A3):

$$Li_{3-3\delta}Y_{1+\delta}Cl_6$$

where $0<\delta \leq 0.15$ is satisfied.

The first solid electrolyte material and/or the second solid electrolyte material may be a material represented by composition formula (A4):

$$Li_{3-3\delta}Y_{1+\delta}Br_6$$

where $0<\delta \leq 0.25$ is satisfied.

The first solid electrolyte material and/or the second solid electrolyte material may be a material represented by composition formula (A5):

$$Li_{3-3\delta+a}Y_{1+\delta-a}Me_aCl_{6-x-y}Br_xI_y$$

where the element Me is at least one selected from the group consisting of Mg, Ca, Sr, Ba, and Zn.

In composition formula (A5), $-1<\delta<2$, $0<a<3$, $0<(3-3\delta+a)$, $0<(1+\delta-a)$, $0 \le x \le 6$, $0 \le y \le 6$, and $(x+y) \le 6$ are satisfied.

The first solid electrolyte material and/or the second solid electrolyte material may be a material represented by composition formula (A6):

$Li_{3-3\delta}Y_{1+\delta-a}Me_aCl_{6-x-y}Br_xI_y$ where the element Me is at least one selected from the group consisting of Al, Sc, Ga, and Bi.

In composition formula (A6), $-1<\delta<1$, $0<a<2$, $0<(1+\delta-a)$, $0 \le x \le 6$, $0 \le y \le 6$, and $(x+y) \le 6$ are satisfied.

The first solid electrolyte material and/or the second solid electrolyte material may be a material represented by composition formula (A7):

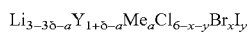
$Li_{3-3\delta-a}Y_{1+\delta-a}Me_aCl_{6-x-y}Br_xI_y$ where the element Me is at least one selected from the group consisting of Zr, Hf, and Ti.

In composition formula (A7), $-1<\delta<1$, $0<a<1.5$, $0<(3-3\delta-a)$, $0<(1+\delta-a)$, $0 \le x \le 6$, $0 \le y \le 6$, and $(x+y) \le 6$ are satisfied.

The first solid electrolyte material and/or the second solid electrolyte material may be a material represented by composition formula (A8):

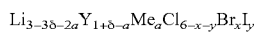
$Li_{3-3\delta-2a}Y_{1+\delta-a}Me_aCl_{6-x-y}Br_xI_y$ where the element Me is at least one selected from the group consisting of Ta and Nb.

In composition formula (A8), $-1<\delta<1$, $0<a<1.2$, $0<(3-3\delta-2a)$, $0<(1+\delta-a)$, $0 \le x \le 6$, $0 \le y \le 6$, and $(x+y) \le 6$ are satisfied.

More specifically, examples of the first solid electrolyte material and/or the second solid electrolyte material include $Li_3YX_6$, $Li_2MgX_4$, $Li_2FeX_4$, $Li(Al, Ga, In)X_4$, and $Li_3(Al, Ga, In)X_6$. The element X is at least one selected from the group consisting of Cl, Br, and I. Note that in the present disclosure, regarding the elements in formulae, expressions such as "(Al, Ga, In)" mean at least one element selected from the group of the elements in the parenthesis. That is, "(Al, Ga, In)" has the same meaning as "at least one selected from the group consisting of Al, Ga, and In". The same applies to other elements.

For example, the first layer 101 may include the first solid electrolyte material as a major component. That is, a mass percentage of the first solid electrolyte material in the entirety of the first layer 101 may be, for example, greater than or equal to 50 mass %, or, greater than or equal to 70 mass %. For example, the first solid electrolyte material may constitute 100 mass % of the first layer 101, excluding incidental impurities that are unintentionally incorporated. With any of these configurations, the charge-discharge characteristics of the battery are further improved. That is, the first layer 101 may be formed of substantially only the first solid electrolyte material. With any of these configurations, the charge-discharge characteristics of the battery are further improved.

The first layer 101 includes the first solid electrolyte material as a major component, and in addition, the first layer 101 may include incidental impurities, or, a portion of the starting materials used for the synthesis of the first solid electrolyte material, a by-product from the synthesis, and/or a decomposition product from the synthesis.

For example, the second layer 102 may include the second solid electrolyte material as a major component. That is, a mass percentage of the second solid electrolyte material in the entirety of the second layer 102 may be, for example, greater than or equal to 50 mass %, or, greater than or equal to 70 mass %. With any of these configurations, the charge-discharge characteristics of the battery are further improved. For example, the second solid electrolyte material may constitute 100 mass % of the second layer 102, excluding incidental impurities that are unintentionally incorporated. That is, the second layer 102 may be formed of substantially only the second solid electrolyte material. With any of these configurations, the charge-discharge characteristics of the battery are further improved.

The second layer 102 includes the second solid electrolyte material as a major component, and in addition, the second layer 102 may include incidental impurities, or, a portion of the starting materials used for the synthesis of the second solid electrolyte material, a by-product from the synthesis, and/or a decomposition product from the synthesis.

The mixture layer 103 may be located out of contact with the negative electrode 202. That is, the negative electrode 202 and the mixture layer 103 may be held out of direct contact with each other by being separated by the second layer 102, which includes the second solid electrolyte material, which has a high reduction resistance. With this configuration, a reductive decomposition of the first solid electrolyte material is inhibited. As a result, the output of the battery is improved.

At least one of the positive electrode 201 and the negative electrode 202 may include an electrolyte material, which may be, for example, a solid electrolyte material. The solid electrolyte material that may be included in the electrodes may be, for example, any of the following: a sulfide solid electrolyte, an oxide solid electrolyte, a halide solid electrolyte, a polymer solid electrolyte, a complex hydride solid electrolyte, and the like. The solid electrolyte material may be, for example, the first solid electrolyte material and/or the second solid electrolyte material.

In the present disclosure, the "oxide solid electrolyte" is a solid electrolyte containing oxygen. The oxide solid electrolyte may contain additional anions, in addition to oxygen anions. The additional anions may be anions other than those of sulfur or those of halogen elements. In the present disclosure, the "halide solid electrolyte" is a solid electrolyte containing a halogen element and not containing sulfur. Furthermore, in the present disclosure, the "solid electrolyte material not containing sulfur" refers to a solid electrolyte material represented by a composition formula that does not include the element sulfur. Accordingly, a solid electrolyte material containing a very small amount of a sulfur component, for example, a solid electrolyte material containing less than or equal to 0.1 mass % sulfur, is regarded as a solid electrolyte material not containing sulfur.

The halide solid electrolyte material may be a compound containing Li, M3, O (oxygen), and X3. The element M3 includes, for example, at least one selected from the group consisting of Nb and Ta. Furthermore, the element X3 is at least one selected from the group consisting of Cl, Br, and I.

The compound containing Li, M3, X3, and O (oxygen) may be, for example, a material represented by a composition formula: $Li_xM3O_yX3_{5+x-2y}$, where x may satisfy $0.1<x<7.0$, and y may satisfy $0.4<y<1.9$.

The sulfide solid electrolyte may be any of the sulfide solid electrolytes mentioned above as examples of the second solid electrolyte material.

The oxide solid electrolyte may be, for example, any of the following: NASICON-type solid electrolytes typified by $LiTi_2(PO_4)_3$ and element-substituted derivatives thereof; $(LaLi)TiO_3$-system perovskite-type solid electrolytes; LISICON-type solid electrolytes typified by $Li_{14}ZnGe_4O_{16}$, $Li_4SiO_4$, $LiGeO_4$, and element-substituted derivatives thereof; garnet-type solid electrolytes typified by $Li_7La_3Zr_2O_{12}$ and element-substituted derivatives thereof; $Li_3PO_4$ and N-substituted derivatives thereof; glass that is based on a Li—B—O compound such as $LiBO_2$ or $Li_3BO_3$ and which contains $Li_2SO_4$, $Li_2CO_3$, or the like added thereto; and glass-ceramics.

The halide solid electrolyte may be any of the compounds represented by composition formula (1) or composition formula (2), which are mentioned above as examples of the first or second solid electrolyte material.

The polymer solid electrolyte may be, for example, a compound of a polymeric compound and a lithium salt. The polymeric compound may have an ethylene oxide structure. Polymeric compounds having an ethylene oxide structure can contain large amounts of a lithium salt. Accordingly, ionic conductivity is further enhanced. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt may be used alone, or two or more lithium salts may be used in combination.

The complex hydride solid electrolyte may be, for example, $LiBH_4$—LiI, $LiBH_4$—$P_2S_5$, or the like.

There are no limitations on a shape of the solid electrolyte materials included in the battery 1000. Examples of the shape of the solid electrolyte materials include acicular shapes, spherical shapes, and ellipsoidal shapes. The shape of the solid electrolyte materials may be, for example, a particulate shape. The positive electrode 201 includes, as a positive electrode active material, for example, a material that has a property of occluding and releasing metal ions (e.g., lithium ions). Examples of the positive electrode active material include lithium transition metal oxides, transition metal fluorides, polyanionic materials, fluorinated polyanionic materials, transition metal sulfides, transition metal oxysulfides, and transition metal oxynitrides. Examples of the lithium transition metal oxides include $Li(Ni, Co, Al)O_2$ and $LiCoO_2$. Using, for example, a lithium transition metal oxide as a positive electrode active material enables the cost of production to be reduced and an average discharge voltage to be increased. To increase an energy density of the battery, lithium nickel cobalt manganese oxide may be used as a positive electrode active material. For example, the positive electrode active material may be $Li(Ni, Co, Mn)O_2$.

When a solid electrolyte material included in the positive electrode 201 has a particulate shape (e.g., a spherical shape), the solid electrolyte material may have a median diameter of less than or equal to 100 μm. When the median diameter of the solid electrolyte material is less than or equal to 100 μm, the positive electrode active material and the solid electrolyte material can be favorably dispersed in the positive electrode 201. As a result, the charge-discharge characteristics of the battery are improved.

The median diameter of the solid electrolyte material included in the positive electrode 201 may be less than a median diameter of the positive electrode active material. In this case, the solid electrolyte material and the positive electrode active material can be favorably dispersed.

The median diameter of the positive electrode active material may be greater than or equal to 0.1 μm and less than or equal to 100 μm. When the median diameter of the positive electrode active material is greater than or equal to 0.1 μm, the positive electrode active material and the solid electrolyte material can be favorably dispersed in the positive electrode 201. As a result, the charge-discharge characteristics of the battery are improved. When the median diameter of the positive electrode active material is less than or equal to 100 μm, a lithium diffusion rate in the positive electrode active material is improved. As a result, the battery can operate with a high output.

The "median diameter" is a particle diameter corresponding to a cumulative volume of 50% in a volume-based particle size distribution. The volume-based particle size distribution can be measured, for example, by using an analyzer, such as a laser diffraction analyzer or an image analyzer. The same applies to the other materials described below.

When volume fractions of the positive electrode active material and the solid electrolyte material included in the positive electrode 201 are expressed as "v1:100-v1", 30≤v1≤95 may be satisfied. Here, v1 represents the volume fraction of the positive electrode active material provided that a total volume of the positive electrode active material and the solid electrolyte material included in the positive electrode 201 is taken as 100. When 30≤v1 is satisfied, a sufficient energy density of the battery can be easily ensured. When v1≤95 is satisfied, a high-output operation of the battery is further facilitated.

The positive electrode 201 may have a thickness of greater than or equal to 10 μm and less than or equal to 500 μm. When the thickness of the positive electrode is greater than or equal to 10 μm, a sufficient energy density of the battery is easily ensured. When the thickness of the positive electrode is less than or equal to 500 μm, a high-output operation of the battery is further facilitated.

The first layer 101, the second layer 102, and the mixture layer 103 may each have a thickness of greater than or equal to 1 μm and less than or equal to 300 μm. When the thickness of each of the layers is greater than or equal to 1 μm, short-circuiting between the positive electrode 201 and the negative electrode 202 is unlikely to occur. When the thickness of each of the layers is less than or equal to 300 μm, a high-output operation of the battery is further facilitated.

The negative electrode 202 includes, as a negative electrode active material, for example, a material that has a property of occluding and releasing metal ions (e.g., lithium ions). Examples of the negative electrode active material include metal materials, carbon materials, oxides, nitrides, tin compounds, and silicon compounds. The metal materials may be elemental metals or alloys. Examples of the metal materials include lithium metals and lithium alloys. Examples of the carbon materials include natural graphite, coke, partially-graphitized carbon, carbon fibers, spherical carbon, artificial graphite, and amorphous carbon. Using silicon (Si), tin (Sn), a silicon compound, a tin compound, or the like enables a capacity density to be improved.

The negative electrode active material may have a median diameter of greater than or equal to 0.1 μm and less than or equal to 100 μm. When the median diameter of the negative electrode active material is greater than or equal to 0.1 μm, the negative electrode active material and a solid electrolyte material can be favorably dispersed in the negative electrode 202. As a result, the charge-discharge characteristics of the battery are improved. When the median diameter of the negative electrode active material is less than or equal to 100 μm, a lithium diffusion rate in the negative electrode active material is improved. As a result, the battery can operate with a high output.

The median diameter of the negative electrode active material may be greater than a median diameter of the solid electrolyte material. In this case, the solid electrolyte material and the negative electrode active material can be favorably dispersed.

When volume fractions of the negative electrode active material and the solid electrolyte material included in the negative electrode 202 are expressed as "v2:100-v2", 30≤v2≤95 may be satisfied. Here, v2 represents the volume fraction of the negative electrode active material provided that a total volume of the negative electrode active material and the solid electrolyte material included in the negative electrode 202 is taken as 100. When 30≤v2 is satisfied, a sufficient energy density of the battery can be easily ensured. When v2≤95 is satisfied, a high-output operation of the battery is further facilitated.

The negative electrode 202 may have a thickness of greater than or equal to 10 μm and less than or equal to 500 μm. When the thickness of the negative electrode is greater than or equal to 10 μm, a sufficient energy density of the battery is easily ensured. When the thickness of the negative electrode is less than or equal to 500 μm, a high-output operation of the battery is further facilitated.

The positive electrode active material and the negative electrode active material may be coated with a coating material so as to reduce interfacial resistance between each of the active materials and the solid electrolyte material. The coating material may be a material having low electron conductivity. The coating material may be an oxide material, an oxide solid electrolyte, or the like.

Examples of the oxide material include $SiO_2$, $Al_2O_3$, $TiO_2$, $B_2O_3$, $Nb_2O_5$, $WO_3$, and $ZrO_2$.

Examples of the oxide solid electrolyte include Li—Nb—O compounds, such as $LiNbO_3$; Li—B—O compounds, such as $LiBO_2$ and $Li_3BO_3$; Li—Al—O compounds, such as $LiAlO_2$; Li—Si—O compounds, such as $Li_4SiO_4$; $Li_2SO_4$; Li—Ti—O compounds, such as $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$. Oxide solid electrolytes have high ionic conductivity and high high-potential stability. Accordingly, using an oxide solid electrolyte as a coating material enables the charge-discharge efficiency of the battery to be further improved.

A non-aqueous electrolyte solution, a gel electrolyte, or an ionic liquid may be included in at least one selected from the group consisting of the positive electrode 201, the electrolyte layer 100, and the negative electrode 202, to facilitate the transfer of lithium ions, thereby improving the output characteristics of the battery.

The non-aqueous electrolyte solution includes a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. One of these may be used alone, or two or more of these may be used in combination.

The non-aqueous electrolyte solution may include at least one fluorinated solvent selected from the group consisting of fluoroethylene carbonate, fluoromethyl propionate, fluorobenzene, fluoroethyl methyl carbonate, and fluorodimethylene carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. One of these may be used alone, or two or more of these may be used in combination. A suitable concentration of the lithium salt is, for example, greater than or equal to 0.5 mol/liter and less than or equal to 2 mol/liter.

The gel electrolyte may be a material in which a non-aqueous electrolyte solution is contained in a polymeric material. Examples of the polymeric material include polyethylene oxide, polyacrylonitrile, polyvinylidene fluoride, polymethylmethacrylate, and polymers having an ethylene oxide linkage.

Examples of a cation that forms the ionic liquid include aliphatic chain quaternary cations, such as tetraalkylammonium and tetraalkylphosphonium; aliphatic cyclic ammoniums, such as pyrrolidiniums, morpholiniums, imidazoliniums, tetrahydropyrimidiniums, piperaziniums, and piperidiniums; and nitrogen-containing heterocyclic aromatic cations, such as pyridiniums and imidazoliums. Examples of an anion that forms the ionic liquid include $PF_6^-$, $BF_4^-$, $SbF_6^-$, $AsF_6^-$, $SO_3CF_3^-$, $N(SO_2F)_2^-$, $N(SO_2CF_3)_2^-$, $N(SOC_2F_5)_2^-$, $N(SO_2CF_3)(SO_2C_4F_9)^-$, and $C(SO_2CF_3)_3^-$. The ionic liquid may contain a lithium salt.

A binding agent may be included in at least one selected from the group consisting of the positive electrode 201, the electrolyte layer 100, and the negative electrode 202, to improve adhesion between particles. The binding agent is used to improve the binding properties of the materials that form the electrodes and/or the electrolyte layers. Examples of the binding agent include polyvinylidene fluoride, polytetrafluoroethylene, polyethylene, polypropylene, aramid resins, polyamides, polyimides, polyamide-imides, polyacrylonitrile, polyacrylic acids, poly(methyl acrylate), poly (ethyl acrylate), poly(hexyl acrylate), polymethacrylic acids, poly(methyl methacrylate), poly(ethyl methacrylate), poly (hexyl methacrylate), polyvinyl acetate, polyvinylpyrrolidone, polyethers, polyether sulfones, hexafluoropolypropylene, styrene butadiene rubber, and carboxymethyl cellulose. The binding agent may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acids, and hexadiene. One of these may be used alone, or two or more of these may be used in combination.

A conductive additive may be included in at least one of the positive electrode 201 and the negative electrode 202 to enhance electron conductivity. Examples of the conductive additive include graphites, such as natural graphite and artificial graphite; carbon blacks, such as acetylene black and Ketjen black; conductive fibers, such as carbon fiber and metal fiber; conductive powders, such as those of carbon fluoride and those of aluminum; conductive whiskers, such as those of zinc oxide and those of potassium titanate; conductive metal oxides, such as titanium oxide; and conductive polymers, such as polyaniline, polypyrrole, and polythiophene. Using a carbon material as a conductive additive enables a cost reduction to be achieved.

Examples of a shape of the battery include coin shapes, cylindrical shapes, prismatic shapes, sheet shapes, button shapes, flat shapes, and stack shapes.

Method for Producing Solid Electrolyte Material

Now, an example of a method for producing the solid electrolyte material represented by composition formula (1) will be described.

Several types of raw material powders are prepared in accordance with the target composition. The raw material powders may be, for example, those of binary halides. The "binary halide" is a compound formed of two elements including a halogen element. For example, when $Li_3YCl_6$ is to be produced, a raw material powder of LiCl and a raw material powder of $YCl_3$ are prepared in a molar ratio of 3:1. In this instance, the elemental species of M and X of composition formula (1) can be determined by the selection of the types of the raw material powders. Furthermore, the values of $\alpha$, $\beta$, and $\gamma$ of composition formula (1) can be adjusted by adjusting the types of the raw material powders, the compounding ratio between the raw material powders, and the synthesis process.

After the raw material powders are mixed together and ground, the raw material powders are caused to react with each other by using a mechanochemical milling method. Alternatively, after the raw material powders are mixed together and ground, the raw material powders may be sintered in a vacuum or in an inert atmosphere. The sintering may be carried out under sintering conditions including a range of higher than or equal to 100° C. and lower than or equal to 400° C. and a duration of one hour or more, for example. By using any of these methods, the solid electrolyte material can be obtained.

Note that the form of the crystalline phase (i.e., the crystal structure) of the solid electrolyte material can be adjusted or determined by the method by which the raw material powders are reacted together and the reaction conditions.

Batteries of the present disclosure can be used as all-solid-state lithium ion secondary batteries, for example.

What is claimed is:

1. A battery comprising:
a positive electrode;
a negative electrode; and
an electrolyte layer disposed between the positive electrode and the negative electrode, wherein:
the electrolyte layer includes a first layer, a second layer, and a mixture layer disposed between the first layer and the second layer,
the first layer includes a first solid electrolyte material,
the second layer includes a second solid electrolyte material, the second solid electrolyte material being different from the first solid electrolyte material,
the mixture layer includes the first solid electrolyte material and the second solid electrolyte material,
the first layer is disposed between the positive electrode and the mixture layer,
the second layer is disposed between the negative electrode and the mixture layer, and
a reduction potential of the second solid electrolyte material is less noble than a reduction potential of the first solid electrolyte material, and
the first solid electrolyte material contains Li, M1, and X1,
where M1 is at least one selected from the group consisting of metalloid elements and metal elements other than Li, and
X1 is at least one selected from the group consisting of F, Cl, Br, and I.

2. The battery according to claim 1, wherein
one of the first solid electrolyte material and the second solid electrolyte material has a Young's modulus lower than a Young's modulus of another of the first solid electrolyte material and the second solid electrolyte material, and
the one of the first solid electrolyte material and the second solid electrolyte material constitutes a volume fraction of greater than 50% in the mixture layer.

3. The battery according to claim 1, wherein the first solid electrolyte material is represented by a composition formula of $Li_{\alpha 1}M1_{\beta 1}X1_{\gamma 1}$,
where $\alpha 1$, $\beta 1$, and $\gamma 1$ are each a value greater than zero.

4. The battery according to claim 1, wherein M1 includes yttrium.

5. The battery according to claim 1, wherein the second solid electrolyte material is a sulfide solid electrolyte.

6. The battery according to claim 1, wherein the second solid electrolyte material contains Li, M2, and X2,
where M2 is at least one selected from the group consisting of metalloid elements and metal elements other than Li, and
X2 is at least one selected from the group consisting of F, Cl, Br, and I.

7. The battery according to claim 6, wherein the second solid electrolyte material is represented by a composition formula of $Li_{\alpha 2}M2_{\beta 2}X2_{\gamma 2}$,
where $\alpha 2$, $\beta 2$, and $\gamma 2$ are each a value greater than zero.

8. The battery according to claim 6, wherein M2 includes yttrium.

* * * * *